T. MEYER & A. KLAGES.
PROCESS FOR THE CONTINUOUS PRODUCTION OF DRY HYDROCHLORIC ACID AND POTASSIUM
BISULFATE FROM POTASSIUM CHLORID AND SULFURIC ACID.
APPLICATION FILED JAN. 6, 1913.
1,099,451.  Patented June 9, 1914.
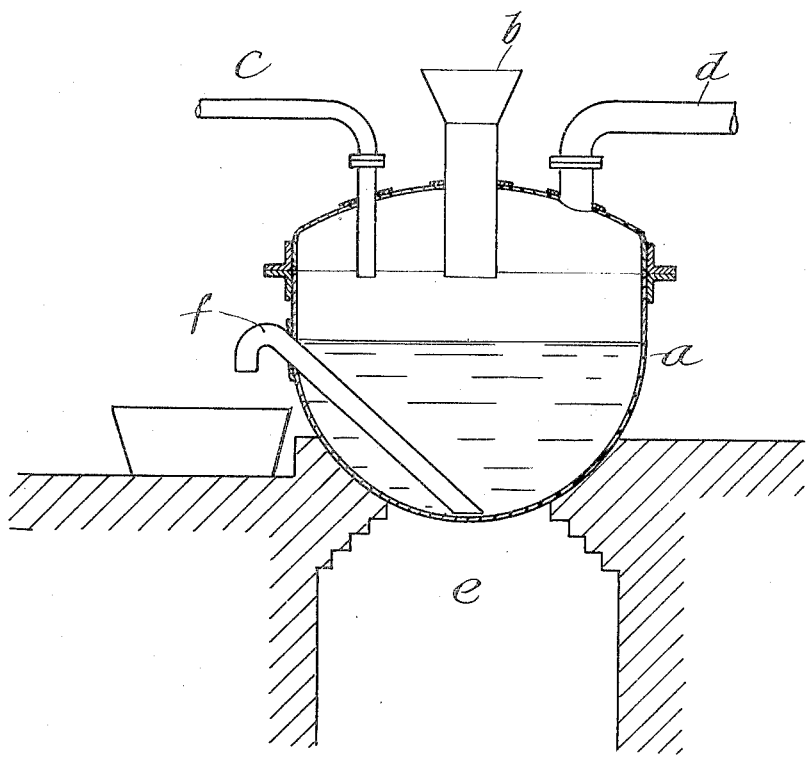

UNITED STATES PATENT OFFICE.

THEODOR MEYER, OF OFFENBACH, AND AUGUST KLAGES, OF MAGDEBURG, GERMANY.

PROCESS FOR THE CONTINUOUS PRODUCTION OF DRY HYDROCHLORIC ACID AND POTASSIUM BISULFATE FROM POTASSIUM CHLORID AND SULFURIC ACID.

1,099,451.  Specification of Letters Patent.  Patented June 9, 1914.

Application filed January 6, 1913. Serial No. 740,463.

*To all whom it may concern:*

Be it known that we, THEODOR MEYER and AUGUST KLAGES, both subjects of the Emperor of Germany, and residents the first of Offenbach, in the Grand Duchy of Hesse, German Empire, and the second of Magdeburg, in the Kingdom of Prussia, German Empire, have invented certain new and useful improvements in processes for the continuous production of dry hydrochloric acid and potassium bisulfate from potassium chlorid and sulfuric acid, of which the following is a specification.

In order to produce neutral potassium sulfate from potassium chlorid and sulfuric acid it is necessary to previously produce good potassium bisulfate. This salt cannot be produced by the pan process which is generally applied for the production of sulfate of sodium and the reason therefor is that the decomposition of the potassium chlorid by sulfuric acid is more difficult than the decomposition of sodium chlorid and further that a volatilization of the sulfuric acid or of the potassium chlorid easily occurs if the temperature exceeds a determined degree. The application of the pan process for this purpose would however be possible if the potassium bisulfate formed at 300° C. a thinly liquid mass. The properties of hot liquid potassium bisulfate produced at a temperature of about 300° were however not known as this substance had never been prepared.

Our experiments have shown that the potassium bisulfate forms at 300° C. a mass which is as liquid as water and which can be drawn off without coagulating. It has further been discovered that the potassium chlorid is completely transformed in the retort and that in this manner the preparation of potassium bisulfate can be effected without the inconveniences of the pan process.

The construction of the retort is of importance. Retorts of cast iron are not very practical; the retort has to be lined with an acid proof chamotte material in order to insure a continuous and uniform working without deterioration of the retort or of the product. If bisulfate of sodium is to be used instead of potassium bisulfate the retort must be similarly constructed. It is further advantageous to effect the chemical transformation as far as possible upon the surface of the hot liquid molten potassium bisulfate by pouring into the retort, which is filled up to the middle of its height with hot liquid potassium bisulfate, potassium chlorid and sulfuric acid, the latter being of about 80 to 90% $H_2SO_4$. Even if sulfuric acid of about 90% is used the action of the reagents upon the cast iron of the retort is still very small.

During the process an active decomposition of the potassium chlorid takes place and the hot liquid potassium bisulfate is continuously drawn off as close as possible at the bottom of the retort at a temperature of 300°. The potassium bisulfate thus obtained forms an easily coagulating and brittle salt which is scarcely hydroscopic and much easier ground than the sulfate of sodium. Its percentage of sulfuric acid can easily be maintained at between 24 to 26% $SO_3$.

In the accompanying drawings the way this improved process is carried out is illustrated.

The apparatus consists of a large retort *a* into which the potassium bisulfate is poured through a funnel *b* fixed in the lid of the retort. If the retort *a* is heated from the furnace *e* the bisulfate begins slowly to melt and it is heated up to about 300° of temperature. If the liquid bisulfate has reached this temperature the potassium chlorid is introduced into the retort through the funnel *b* and the sulfuric acid through the pipe *c* which is also fixed in the lid of the retort. These two products are allowed to flow in continuously. The gases escape through the outflow pipe *d* mounted in the lid of the retort and the bisulfate is drawn off the retort through the inclined outflow tube *f*, the open lower end of which is situated on the bottom of the retort its outer end projecting through the side wall of said retort. The level of the molten bisulfate must be maintained at such a height that part of the bisulfate can freely flow out through the overflow pipe *f*.

We claim:—

Process for the continuous production of dry hydrochloric acid and potassium bisulfate from potassium chlorid and sulfuric acid consisting in introducing into a large retort potassium bisulfate, in heating it to a temperature which is high enough to transform the potassium bisulfate into a liquid substance, in introducing into the retort potassium chlorid and sulfuric acid, in maintaining the temperature at such a degree that the bisulfate of potassium remains liquid in order to insure that the transformation of the potassium chlorid and sulfuric acid takes place on the surface of the liquid bisulfate and in drawing off continuously the heavy bisulfate which settles on the bottom of the retort, substantially as described and for the purpose set forth.

In witness whereof we have hereunto set our hands in the presence of two witnesses.

THEODOR MEYER.
AUGUST KLAGES.

Witnesses as to Theodor Meyer:
JEAN GRUND,
ELSE MEBUS.

Witnesses as to August Klages:
E. KOSTENBADER,
JOHANNES GROTE.